H. K. SCHELL.
SHEAR GUARD.
APPLICATION FILED MAR. 9, 1918.
1,272,123.
Patented July 9, 1918.
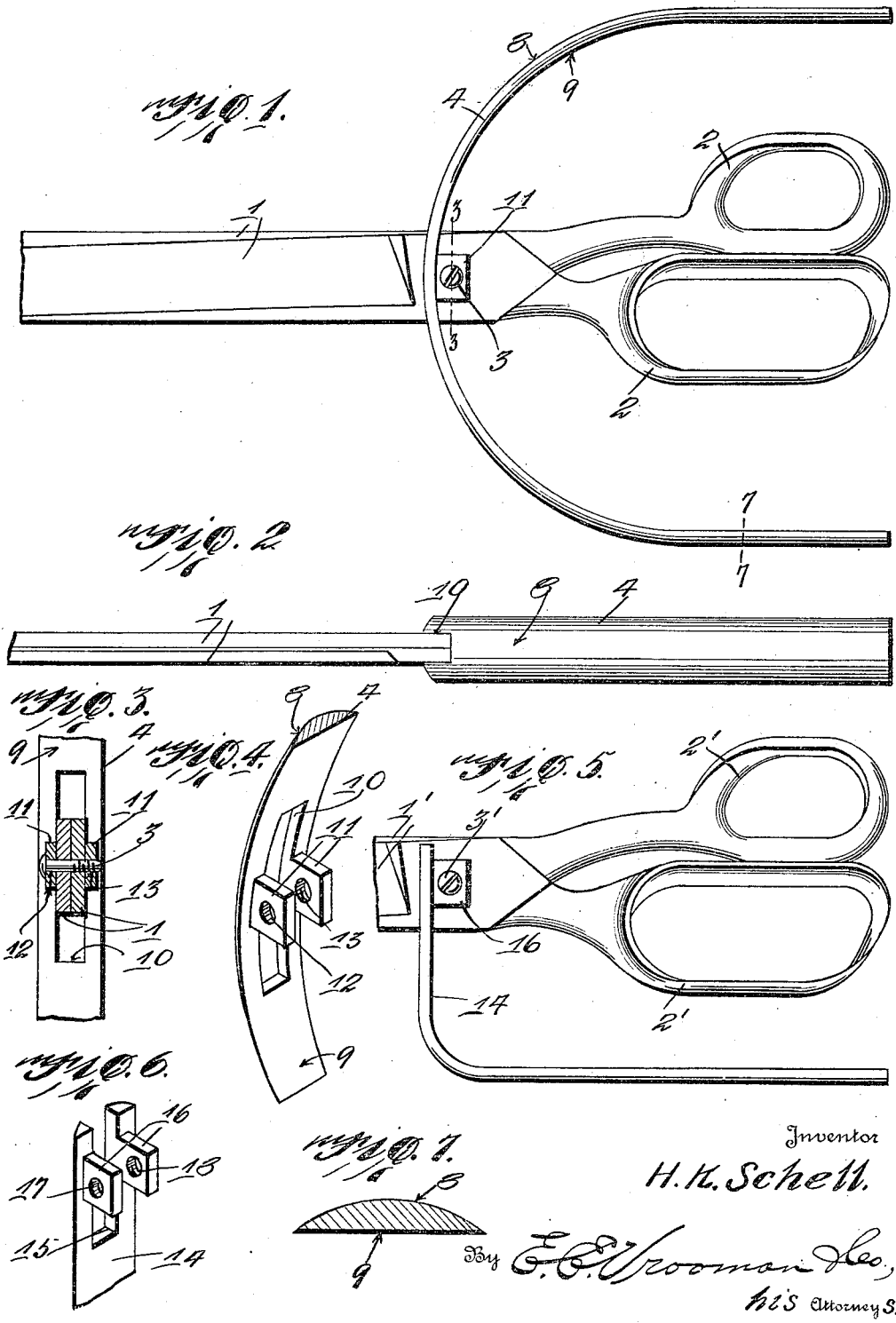

UNITED STATES PATENT OFFICE.

HARVEY K. SCHELL, OF POLO, ILLINOIS.

SHEAR-GUARD.

1,272,123.

Specification of Letters Patent.

Patented July 9, 1918.

Application filed March 9, 1918. Serial No. 221,564.

*To all whom it may concern:*

Be it known that I, HARVEY K. SCHELL, a citizen of the United States of America, residing at Polo, in the county of Ogle and State of Illinois, have invented certain new and useful Improvements in Shear-Guards, of which the following is a specification, reference being had therein to the accompanying drawings.

This invention relates to a shear or scissors guard, which is so arranged as to protect the hand of the user under all conditions.

Another object of this invention is the production of a shear or scissors guard, which comprises a shield positioned upon the shears or scissors in such a manner as to overhang the grips thereof, whereby when the shears or scissors are cutting through such material as wire mesh or tin the user's hand will be protected from the sharp or severed portions of the wire mesh or tin passing adjacent the grip of the shears or scissors.

A still further object of this invention is the production of a shear or scissors guard, which comprises a shield having a slot formed therein, through which the shears or scissors project, while ears are formed upon the guard in such a manner as to permit the handle screwed to the shears or scissors to be passed therethrough, for retaining the guard in a set position.

With these and other objects in view, this invention consists of certain novel combinations and arrangements of parts, as will be hereinafter fully described and claimed.

In the accompanying drawing:—

Figure 1 is a side elevation of the guard in use.

Fig. 2 is a top plan view of the shear or scissors guard.

Fig. 3 is a section taken on line 3—3 of Fig. 1.

Fig. 4 is a fragmentary detail perspective view of a portion of the guard, illustrating the manner in which the ears are formed adjacent the slot.

Fig. 5 is a side elevation of a slightly modified form of the guard.

Fig. 6 is a fragmentary detail perspective view of the ears, and attaching end of the guard.

Fig. 7 is an enlarged transverse sectional view taken on the line 7—7 of Fig. 1.

By referring to the accompanying drawing by numerals it will be seen that the guard is adapted to be used upon ordinary shears or scissors, which comprise the usual blades 1, having grips 2. The usual screw 3 passes through the blades 1, adjacent the grips 2, for pivotally connecting the blades together.

The guard is formed from a single bar of material and comprises a substantially U-shaped body 4. This body 4 has a convexed outer surface, as shown at 7, and a flat inner surface 9. The body 4 is provided with a longitudinally extending slot or elongated aperture 10 formed therein adjacent its central portion, as shown in Fig. 4. The ears 4, are formed integral upon the body 4, in alinement with each other and at a point adjacent the central portion of the slot 10. These ears 11 are provided with alined openings 12 and 13, the opening 13 being internally threaded as shown in Fig. 4.

This guard is positioned upon the pair of shears or scissors by projecting the shears or scissors through the slot 10, as shown in Figs. 2 and 3, and at this time the screw 3 may pass through the opening 12 formed in one of the ears 11 through the shears or scissors, and then screwed into the internally threaded opening 13 formed in the remaining ear 11. In this manner it will be noted that the guard will be carried at points adjacent the inner end portions of the blades 1, so as to cause the guard to overhang the grips 2, as shown in Figs. 1 and 2. Since the slot 10 is elongated sufficient space is provided for the opening and closing of the blades 1, as the grips are moved apart or drawn together. It will further be noted that the ears 11 will hold the grip in a set position upon the shears or scissors, thereby causing the body to overhang the grip under all conditions. When the shears or scissors are used to cut tin or wire mesh, it is obvious that the cut edges of the wire mesh or tin, where the material has been cut will be held spaced from the grips 2, by coming into engagement with the convexed outer surface 8 of the body 4 of the guard. In this way, the cutting edges which would otherwise injure the hands of the user, are held spaced from the grip, so as to permit the grips to be actuated without danger of the cutting edges injuring the hands of the user. By referring to Figs. 5 and 6, it will be noted that a substantially L-shaped body 14 is disclosed, and in one end of this body 14 there is formed the slot 15. The ears 16 are formed integral upon the body 14 upon each side of the slot and in alinement with each other, while one ear 16 is provided with an opening 17, while the remaining ear is provided with an integral opening 18. The guard shown in its modified form is positioned upon the usual blade 1' of the shears or scissors by projecting the blade 1' through the slot 15 formed in one end of the slot 14. At this time the usual screw 3' may be passed through the opening 17 formed in one of the ears 16 and then through the blades 1' so as to be screwed into the integral opening 18 formed in the remaining ear 16, for securing the guard shown in the modified form in the same manner as the guard in the preferred form is carried upon the shears or scissors. The L-shaped body 14 projects rearwardly in the grips 2' in spaced relation with respect thereto, so as to allow the shears or scissors to be operated while the material which has been cut may be directed beneath the grips 2' so as to be held spaced therethrough, by the L-shaped body 14.

It will be seen that since the ears of the guard shown in both forms of the invention are carried upon the pivoted screw of the shears or scissors, the guard may be pivoted when necessary to accommodate various actions of the material being cut, or the position in which the shears or scissors are being held, and at the same time allow sufficient space for the movement of the grips of the shears or scissors.

From the foregoing description, it will be seen that a very efficient and simple guard has been provided for shears or scissors, by the construction of ears pivotally mounted upon the screw of the shears or scissors, while the shears or scissors may be passed through the slot of the guard so as to be easily operated and at the same time allow the guard to overhang the grips of the shears or scissors, so as to efficiently protect the hand of the user, against injury from the material which is being cut.

What is claimed is:—

1. As a new article of manufacture, a shear guard comprising a body having an elongated aperture at its middle, said body provided with parallel apertured ears contiguous to said aperture, and said ears projecting inwardly, whereby a shears can be projected through said aperture and attached to said ears, substantially as shown and described.

2. As a new article of manufacture, a guard for shears comprising a U-shaped body, said body having an elongated aperture formed therein between its ends, and means formed contiguous to said aperture for supporting a shears in said aperture and upon said body.

3. As a new article of manufacture, a guard for shears comprising a U-shaped body, said body having a convex outer surface and an even inner surface, said body having an elongated aperture formed therein near its middle, and parallel apertured ears formed upon said body between its outer edges and contiguous to the middle of said elongated aperture, whereby a shears may be pivotally supported in said aperture upon said ears.

4. A device of the class described, comprising a body provided with an aperture formed therein between its ends, and said body provided with angularly-disposed shear supporting means intermediate its ends and contiguous to said aperture.

In testimony whereof I hereunto affix my signature.

HARVEY K. SCHELL.

Copies of this patent may be obtained for five cents each, by addressing the "Commissioner of Patents, Washington, D. C."